(12) United States Patent
Frank (10) Patent No.: US 11,249,451 B1
(45) Date of Patent: Feb. 15, 2022

(54) DIELECTRIC ENERGY STORAGE SYSTEMS

(71) Applicant: Blue Horizons Innovations,LLC, Coconut Creek, FL (US)

(72) Inventor: David L. Frank, Highland Beach, FL (US)

(73) Assignee: Blue Horizons Innovations, LLC, Coconut Creek, FL (US)

( * ) Notice: Subject to any disclaimer, the term of this patent is extended or adjusted under 35 U.S.C. 154(b) by 0 days.

(21) Appl. No.: 17/205,497

(22) Filed: Mar. 18, 2021

Related U.S. Application Data

(63) Continuation-in-part of application No. 17/204,766, filed on Mar. 17, 2021.

(60) Provisional application No. 63/130,940, filed on Dec. 28, 2020.

(51) Int. Cl.
| | | |
|---|---|---|
| *H02J 7/34* | (2006.01) | |
| *G05B 19/042* | (2006.01) | |
| *G08B 21/18* | (2006.01) | |
| *G10L 15/22* | (2006.01) | |

(52) U.S. Cl.
CPC ....... *G05B 19/0428* (2013.01); *G08B 21/185* (2013.01); *H02J 7/345* (2013.01); *G05B 2219/24033* (2013.01); *G10L 15/22* (2013.01); *H02J 2207/50* (2020.01)

(58) Field of Classification Search
CPC ....... G05B 19/0428; G05B 2219/24033; H02J 2207/50; H02J 7/345; G08B 21/185; G10L 15/22
See application file for complete search history.

(56) References Cited

U.S. PATENT DOCUMENTS

| | | | | |
|---|---|---|---|---|
| 5,390,073 | A * | 2/1995 | McMillan ................ | H01B 3/44 361/327 |
| 2010/0172066 | A1* | 7/2010 | Baer ....................... | B32B 27/36 361/323 |
| 2017/0117818 | A1* | 4/2017 | Shao ..................... | H02J 50/001 |

* cited by examiner

*Primary Examiner* — Richard Isla
*Assistant Examiner* — Johali A Torres Ruiz
(74) *Attorney, Agent, or Firm* — Fleit Intellectual Property Law; Jose Gutman

(57) ABSTRACT

A Dielectric Energy Storage System (DESS) and method that stores energy for a wide variety of applications.

16 Claims, 6 Drawing Sheets

DIELECTRIC ENERGY STORAGE SYSTEMS

BACKGROUND

The present disclosure generally relates to energy storage devices that are based on the Dense Energy Ultra-Cell (DEUC) applied in a Dielectric Energy Storage System (DESS).

Current battery and rechargeable battery technologies do not lend themselves to a broad range of applications. Limited recharge cycles, limited energy density and limited voltage all have restrictive impacts on a wide range of applications. Large and heavy batteries are applied to electric vehicles and contribute a significant portion of the weight of the vehicle to enable driving range.

Current capacitors and electrolytic energy storage systems do not have the energy storage capacities, charge cycles or rapid charge capabilities that can compete with the DEUC technology.

Many important applications demand high energy density, high operating voltage per cell, and an extended battery life-cycle.

Therefore a need exists to overcome the problems with the prior art as discussed above.

BRIEF SUMMARY

The present disclosure generally relates to a new energy storage system based on the Dense Energy Ultra-Cell (DEUC technology. The Dielectric Energy Storage System (DESS) brings together all of the components necessary to charge the Dielectric Energy Storage Module (DESM), store energy within the DESM and deliver controlled output voltage and amperage to the selected application. The DESS provides rapid charging, and over 500,000 recharge cycles. The stored voltage can be as high as 2,000 volts.

The Dielectric Energy Storage System (DESS) is comprised of a Dielectric Energy Storage Module (DESM) based on the Dense Energy Ultra-Cell (DEUC) technology, a DESM Charging System (DCS) and an output Voltage and Amperage Regulator (VAR).

Dielectric Energy Storage Module (DESM)

The DEUC technology enables a dense energy power storage device. The DEUC Element is the building bock of the Dense Energy Storage System. According to various embodiments the DEUC Element is designed as a multilayer ceramic capacitor with a proprietary dielectric energy storage material that provides high permittivity, high internal resistivity to retain charge and high breakdown voltage. One or more DEUC Elements are interconnected to make the Dielectric Energy Storage Module (DESM).

Dielectric Energy Storage System (DESS) Charging

A dielectric energy storage charge and output voltage regulation system is provided as part of the Dielectric Energy Storage Module (DESM). The device is known as the Dense Energy Ultra-Cell (DEUC). The dielectric energy storage device stored direct current (DC) voltage. The DESM Charging System (DCS) can accept DC voltage or alternating current (AC) voltage and will provide a stepped-up DC voltage to the solid state-dielectric energy storage device. The output of the dielectric energy storage device is DC voltage and current which is stepped-down from the stored voltage level to the desired application voltage. Amperage is regulated on the out-put voltage to provide the desired application voltage and current. The DC output voltage may be converted to AC voltage depending on application needs.

In a battery technology energy storage device, the amps are depleted as the electric energy is discharges. Contrary to a battery technology, the DEUC dielectric energy storage system, the voltage is depleted as the dielectric energy is discharged.

There are a broad range of charging systems, voltage step up systems, voltage step down systems and amperage control systems, many of which can be used in a Dielectric Energy Storage System (DESS).

DESS Output Voltage and Amperage Regulator

A dielectric energy storage charge and output voltage regulation system is provided to support the Dielectric Energy Storage Module (DESM). The dielectric energy storage device stores direct current (DC) voltage. The charging system can accept DC voltage or alternating current (AC) voltage and will provide a stepped-up DC voltage to the solid state-dielectric energy storage device. The output of the dielectric energy storage device is DC voltage and current which is stepped-down from the stored voltage level to the desired application voltage. Amperage is regulated on the out-put voltage to provide the desired application voltage and current. The DC output voltage may be converted to AC voltage depending on application needs.

DESS Management

The DESS Management System (DESS-MS) monitors a variety of parameters and manages the DESS operational characteristics to provide optimized performance and increase safety measures.

DESS Safety

The DESS system safety features include the use of a dielectric fluid to act as an insulating and isolating fluid between the internal components of the DESM. In addition, a dielectric fluid with Electrorheological (ER) characteristics can be used as a damper fluid. In one embodiment, these fluids may flow through the DESM to cool the DESM components and pass through a cooling station and return to the DESM. In another embodiment the fluids may reside in the DESM and be cooled by a heat sink.

To ensure safety in case of a short in the DESS system, multiple layers of fused and or switching devices are deployed at strategic points within the DESM and subcomponents and between DESMs in the DESS Array.

The first fused point is at the Dense Energy Ultra-Cell Element where the electrode layers within the DEUC Elements are designed to create an open and disconnect from the collection plate upon a short across the left and right electrode.

BRIEF DESCRIPTION OF THE DRAWINGS

The accompanying figures in which like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

As required, detailed embodiments are disclosed herein; however, it is to be understood that the disclosed embodiments are merely examples and that the devices, systems and methods described herein can be embodied in various forms. Therefore, specific structural and functional details disclosed herein are not to be interpreted as limiting, but merely as a basis for the claims and as a representative basis for teaching one of ordinary skill in the art to variously employ the disclosed subject matter in virtually any proprietary detailed structure and function. Further, the terms and phrases used herein are not intended to be limiting, but rather, to provide an understandable description. Additionally, unless otherwise specifically expressed or clearly understood from the context of use, a term as used herein describes the singular and/or the plural of that term.

The present disclosure generally relates to a new Dielectric Energy Storage System (DESS) that is based on the Dense Energy Ultra-Cell (DEUC) technology. The Dielectric Energy Storage System (DESS) brings together all of the components necessary to charge the DESS, store energy within the DESS and deliver controlled output voltage and amperage to the selected application. The DESS provides rapid charging, and over 500,000 recharge cycles. The stored voltage can be as high as 2,000 volts.

DEUC Technology

The DEUC technology provides a dense energy power storage device. The DEUC Element is the building bock of the Dense Energy Storage System. According to various embodiments the DEUC Element is designed as a multilayer ceramic capacitor with a proprietary dielectric energy storage material that provides high permittivity, high internal resistivity to retain charge and high breakdown voltage.

Figure 1:
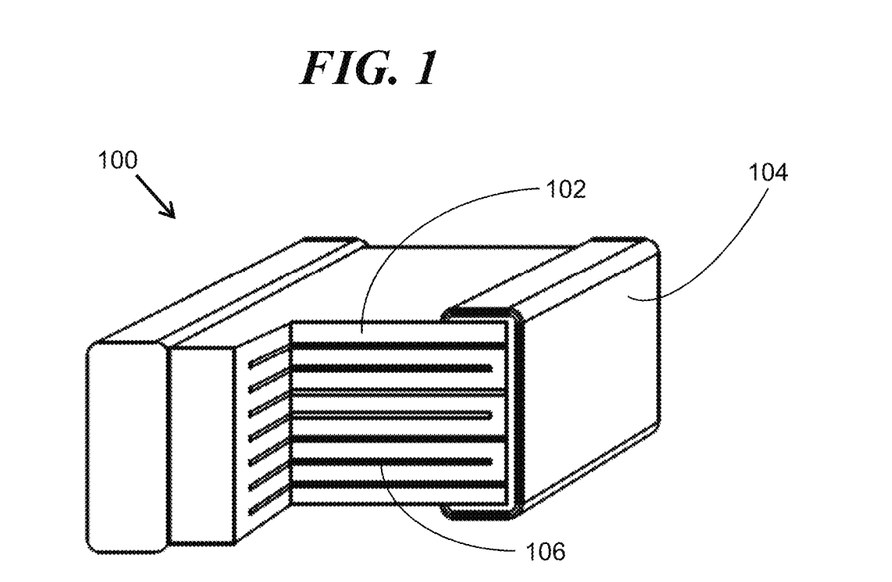
FIG. 1 is an illustration of an example of a DEUC Element, which is an energy storage device, with an MLCC Structure.

FIG. 1 illustrates the individual dielectric energy storage layers 102, internal electrode layers 106 and external electrodes 104 within a DEUC Element 100 in a multilayer ceramic capacitor configuration.

Figure 2:
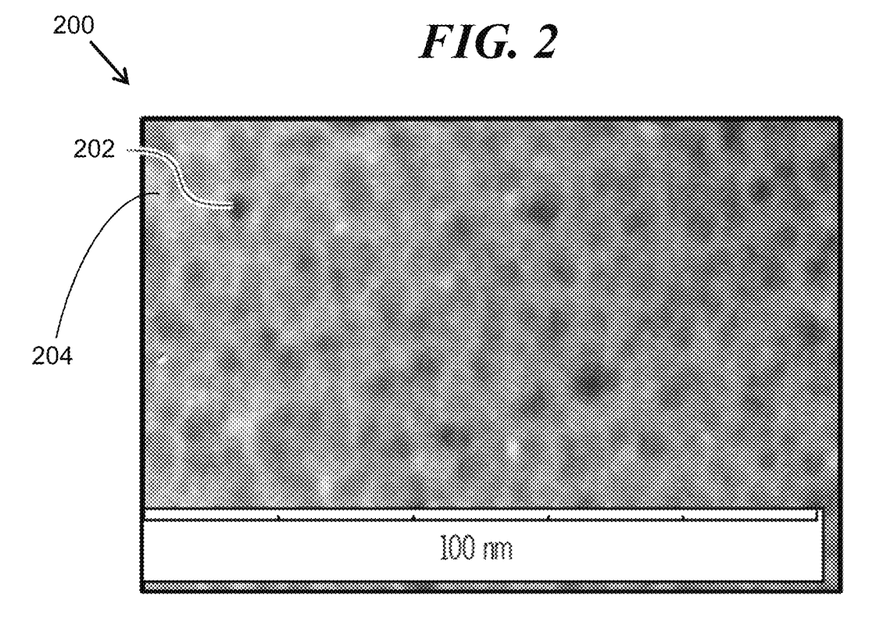
FIG. 2 is an example representation of a Transmission Electron Microscopy (TEM) image of modified internal barrier layer capacitor (IBLC) material grains (e.g., nanoparticles) suspended in a matrix and forming a Dielectric Energy Storage Material (DESM) in the DEUC Element shown in FIG. 1.

FIG. 2 illustrates a representation of a Transmission Electron Microscopy image of a modified internal barrier layer capacitor (IBLC) material 200 including nanoparticles, also referred to as grains, 202 suspended in a matrix 204 forming a Dielectric Energy Storage Material (DESM) 200 as dielectric material 102 in a DEUC Element 100 such as shown in FIG. 1.

According to various embodiments, the modified internal barrier layer capacitor material 200 has a dielectric permittivity of at least 50,000; a resistivity of at least $10^{12}$ ohms/centimeter; and a dielectric strength of at least 50 volts per micron of thickness.

According to various embodiments, the modified internal barrier layer capacitor material 200 is a new composition of matter that, for example, includes two or more highly resistive materials which are integrated into a chemistry of a grain boundary of an internal barrier layer capacitor material including a greater than 75% percentage of primary nanoparticles relative to all particles in a defined volume of the respective material. A primary nanoparticle typically measures less than or equal to approximately 20 nm in a critical dimension of each such primary nanoparticle.

This new composition of matter results, for example, in a high permittivity of a dielectric compound, a high resistivity of the dielectric compound, and a low leakage current and high breakdown voltage of the dielectric compound, thereby enabling a highly efficient energy storage dielectric material.

In one example, the new compound is formed by a sequential addition of two or more highly resistive materials that increase an internal barrier layer capacitor material resistivity and therefore increase the ability to apply a strong voltage across the internal barrier layer capacitor material. The inventor has discovered that by adding multiple resistive materials to calcium copper titanium oxide (CCTO) in a specific sequence it modifies the chemistry of the CCTO outer grain boundary. When certain resistive materials are added in the correct sequence and correct methods, the permittivity, resistivity and breakdown voltage can be optimized. Additionally, the inventor has discovered that by applying a novel particle reduction method to one or more materials (typically oxide materials) for adding into the internal barrier layer capacitor material a new compound is formed comprising an internal barrier layer capacitor material including a greater than 75% percentage of primary nanoparticles relative to all particles in a defined volume of the respective material. This novel particle reduction method, for example, results in a highly efficient energy storage dielectric material.

The small size of very fine nanoparticles (e.g., primary nanoparticles) allows them to have unique characteristics that may not be possible on a macro-scale.

According to various embodiments, the dielectric energy storage material includes an internal barrier layer capacitor material nanoparticles encapsulated in a resistive material forming core shell nanoparticles in a core shell nanoparticles material. The core shell nanoparticles material, for example, can be heat treated to between 600° C. to 1,000° C. which hardens the shell material. The core shell nanoparticles material can be further heated to between 900° C. to 1,100° C. which sinters the core material forming fully sintered core shell nanoparticles material. The fully sintered core shell nanoparticles material is combined with a resistive material (e.g., $SiO_2$ and/or another oxide material) which form a loaded matrix that is loaded with the core shell nanoparticle material. The loaded matrix is heat treated to form a hardened loaded matrix material. This matrix material can also be referred to as one or more of a dielectric energy storage material, a dielectric energy storage material matrix, dielectric energy storage matrix, or the like.

According to various embodiments, the core of the core shell nanoparticles is comprised of calcium copper titanate (CCTO), the shell is comprised of $SiO_2$, and the matrix is comprised of $SiO_2$. In certain embodiments, the core of the core shell particles is comprised of calcium copper titanate (CCTO) doped with one or more of the following materials: $Al_2O_3$ (Aluminium Oxide), Ru (Ruthenium), La (Lanthanum), or $TeO_2$ (Tellurium oxide).

One or more DEUC Elements 100 can he interconnected in series and/or parallel to create a DEUC Cell 306. In various embodiments, multiple DEUC Elements 100 are interconnected in series and/or parallel to form a DEUC Stack 302, as shown in the example of FIG. 3.

A DEUC Stack 302 typically includes a control and interface module 304. The control and interface module 304, according to the example, is operationally coupled with the DEUC Elements 100 in the DEUC Stack 302. The control and interface module 304 can include one or more sensor modules that monitor physical conditions of the DEUC Elements 100 in the DEUC Stack 302. The control and interface module 304 provides circuit control signals that can electrically couple various DEUC elements 100 together and/or electrically isolate one or more DEUC Elements 100 from the other DEUC Elements 100 in the DEUC Stack 302. The control and interface module 304 can manage physical and/or electrical connections in the DEUC Stack 302, such as while charging energy is coupled into the DEUC elements 100, storage of energy is maintained in the DEUC elements 100, and discharging energy is coupled out from the DEUC elements 100. The control and interface module 304 also provides an electrical interface to the DEUC Stack 302, which can be used to couple charging energy into the DEUC elements 100 in the DEUC Stack 302, and to couple discharging energy out from the DEUC elements 100.

Figure 3:
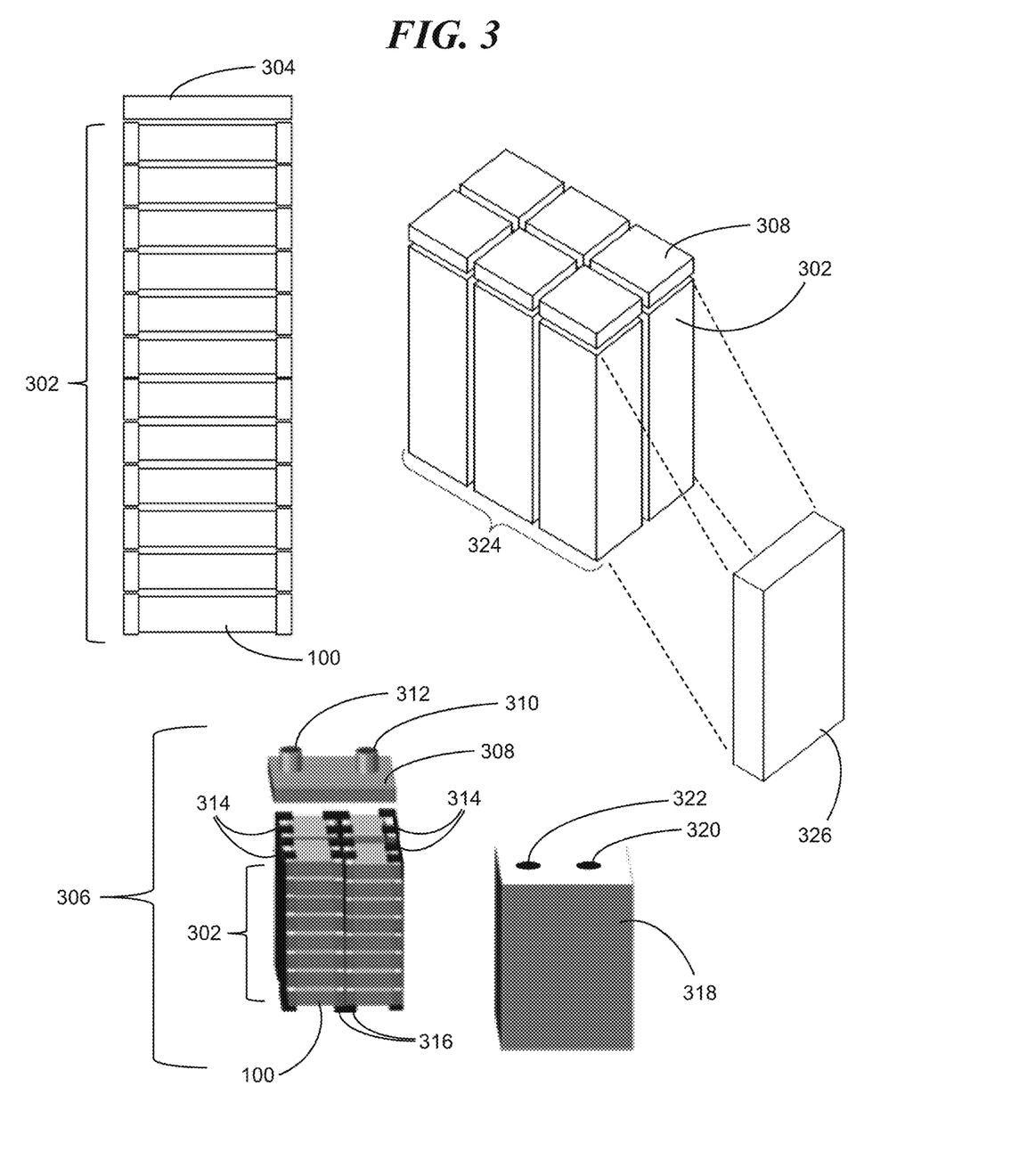
FIG. 3 is a diagram illustrating examples of a DEUC Element used as a building block to create various energy storage structures and systems.

According to various embodiments, multiple DEUC Stacks 302 can be interconnected to form a DEUC Cell 306, as shown in the example DEUC Cell 306 of FIG. 3. A DEUC Cell 306 typically, although not necessarily, includes a control and interface module 308. The example control and interface module 308 shown in FIG. 3 includes a positive charge terminal 310 and a negative charge terminal 312. The DEUC Cell 306 includes internal positive electrodes 314 and internal negative electrodes 316. These internal electrodes 314, 316, provide interconnections between DEUC Stacks 302 inside the DEUC Cell 306. A housing/enclosure/cover 318 covers and protects internal components of the DEUC Cell 306. The housing 318 includes two openings (ports) 320, 322, for passing therethrough the positive charge terminal 310 and the negative charge terminal 312 while the housing 318 encloses the internal components of the DEUC Cell 306.

In various embodiments, multiple DEUC Cells 306 are interconnected to form a DEUC Module 324. Each of the DEUC Cells 306, in the DEUC Module 324, includes multiple DEUC Stacks 302 with each DEUC Stack 302, in this example, including a control and interface module 308. The DEUC Module 324 also is coupled to a DEUC controller module 326 to create a Dielectric Energy Storage Module (DESM) which is a component in a Dielectric Energy Storage System (DESS).

The DEUC controller module 326 includes at least one processor which controls electrical connections and electrical isolation between the one or more DEUC Elements 100 and between each of the multiple DEUC Stacks 302 in the DEUC Module 324. The DEUC controller module 326 also includes (or is associated with) one or more sensor modules, operatively coupled with the at least one processor, and which are configured to monitor measured values of one or more physical conditions of respectively one or more DEUC Elements 100 in the DEUC Module 324. The one or more sensor modules communicate sensor data to the at least one processor in the DEUC controller module 326. A combination of the DEUC Module 324 and the DEUC controller module 326 can also be referred to as a Dielectric Energy Storage Module (DESM), which is a component in a Dielectric Energy Storage System (DESS). The one or more DEUC Elements 100 can also be referred to as one or more subcomponents of a Dielectric Energy Storage Module (DESM) in a Dielectric Energy Storage System (DESS).

Figure 4:
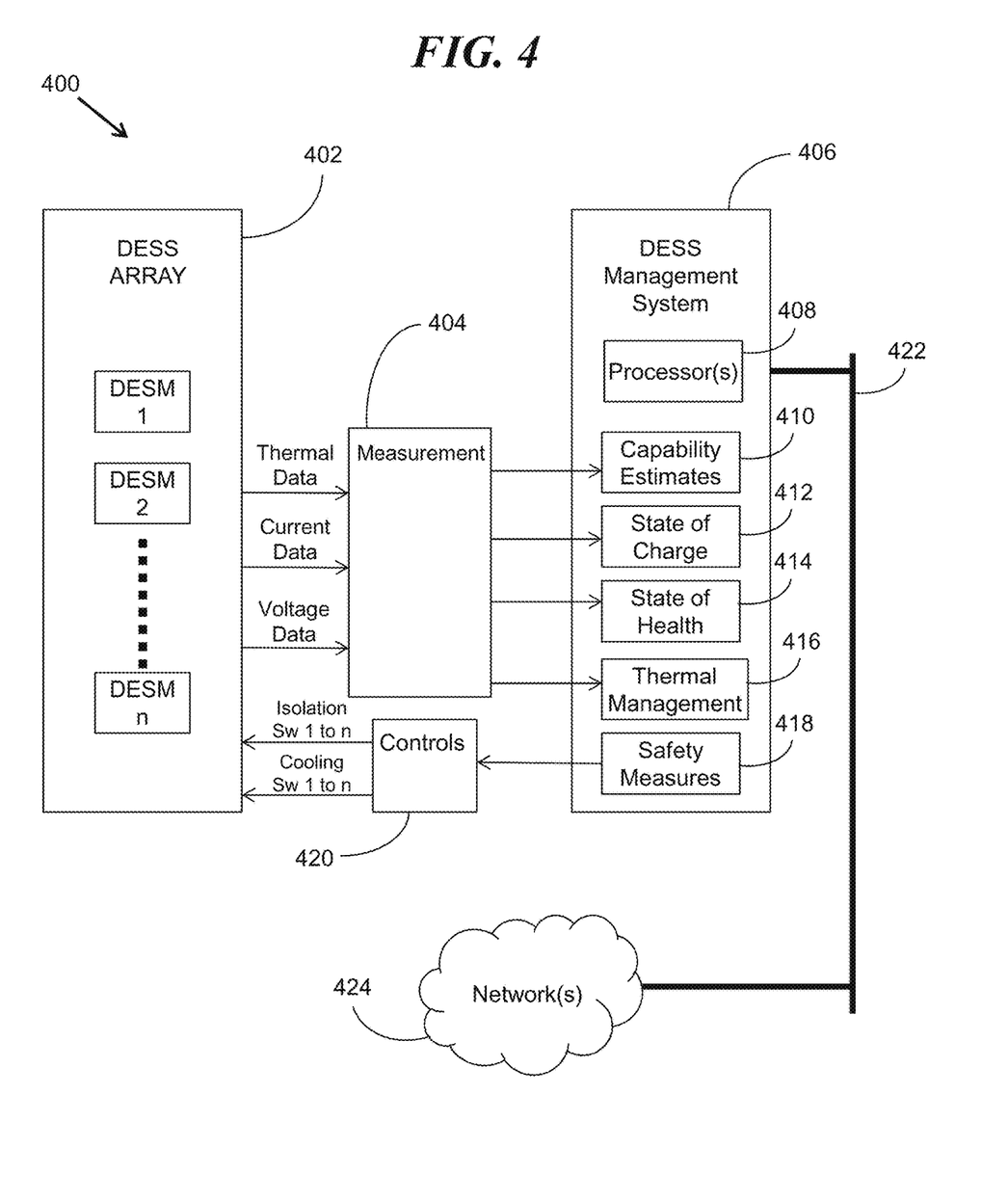
FIG. 4 is a diagram illustrating a first example embodiment of a Dielectric Energy Storage System (DESS)

In certain embodiments, multiple DEUC Modules 324 can be interconnected to form a Dielectric Energy Storage System (DESS) Array 402 such as shown in the example of FIG. 4.

As discussed above, FIGS. 3 and 4 illustrate examples of how the DEUC Element 100 can be used as a building block to create various Dielectric Energy Storage System (DESS) components.

In summary, one or more DEUC elements 100 can be combined to create a DEUC stack 302. One or more DEUC Stacks 302 can be combined to create a DEUC Cell 306. One or more DEUC Cells 306 can be combined to create a Dielectric Energy Storage Module (DESM) 324, 326.

A Dielectric Energy Storage System (DESS), according to various embodiments, can include one or more of the following:

A DEUC Element 100, as a building block of a DEUC Stack 302 and/or a DEUC Cell 306;

A DEUC Stack 302, where one or more DEUC Elements 100 are connected in series and/or parallel circuit(s) to form the DEUC Stack 302;

A DEUC Cell 306, where one or more DEUC Elements and/or DEUC Stacks can be connected in series and/or parallel circuit(s) to form the DEUC Cell 306; or A Dielectric Energy Storage Module (DESM) 324, 326, where one or more DEUC Cells 306 can be interconnected in series and/or parallel circuit(s) to form the Dielectric Energy Storage Module (DESM) 324, 326.

Additionally, a DESS 400 can include a Dielectric Energy Storage System (DESS) Array 402, where one or more DESM's 324, 326, can be combined and interconnected in series and/or parallel circuit(s) to form a DESS Array 402. See the example DESS and components shown in FIG. 4.

Dielectric Energy Storage System (DESS)

The Dielectric Energy Storage System (DESS), according to various embodiments, has a charging system to charge one or more components of the DESS, such as one or more Dielectric Energy Storage Modules (DESM), one or more DEUC Cells, one or more DEUC Modules, or one or more DEUC Arrays, or a combination thereof.

The charging system, according to certain embodiments, applies DC voltage and a charge current to one or more DESMs 324, 326, to store charge energy in the one or more DESMs 324, 326. The one or more DESMs 324, 326, according to various embodiments, will apply the stored charge energy to one or more applications. In a dielectric energy storage module 324, 326, the voltage is depleted as an application consumes energy from the DESMs 324, 326. This is a different operation from a conventional battery device where amperage (current) from the battery device is depleted. In the DESM 324, 326, the depth of discharge is calculated by taking the application voltage output from the DESM 324, 326, and dividing the application voltage output by the charged voltage stored in the DESM 324, 326.

For example, and not for limitation, an electric vehicle operating at up to 450 volts DC, would have a 71.8% depth of discharge with a DESM charge of 1,600 volts DC. The 450 volts DC as an output voltage from a DESM 324, 326, is enabled through a voltage step-down and amperage control system from 1,600 volts dc to 450 volts DC. This provides a consistent output voltage capability of 450 volts dc from the DESM 324, 326.

As will be discussed more fully below, according to various embodiments, the depth of discharge can be enhanced by using a remaining DESM voltage below 450 volts dc in a step-up voltage configuration to continue to provide 450 volts dc as the DESM output voltage drains down to approximately ~100 volts dc, providing a 93.7% depth of discharge.

FIG. 4 illustrates one example embodiment of a DESS Management System (DESS-MS) 406. The DESMs 324, 326, the subcomponents of the DESMs 324, 326, and the DESS Array 402, can individually or collectively report thermal data (410,411) a measurement system 404 in the DESS 400. Also, current data and voltage data can also be reported to the measurement system 404. The measurement system 404 reports data to at least one processor of the DESS-MS 406. The DESS-MS 406 can use the reported data from the measurement system 404 to estimate output voltage capability 410 for the DESS Array 402, to estimate a state of charge 412 of the DESS Array 402 and of the individual components of the DESS Array 402. The DESS-MS 406 can use the reported data to analyze and record a state of health 414 of the DESS Array 402. The DESS-MS 406 can use the reported data to analyze and manage a thermal state of the DESS Array 402 and of the individual components of the DESS Array 402. The DESS-MS 406 can use the reported data to analyze and manage a state of charge stored in the DESS Array 402 and in the individual components of the DESS Array 402. The DESS-MS 406 can use the reported data to analyze and manage an estimated output voltage capability from the DESS Array 402. The at least one processor of the DESS Management System 406 can also provide this reported data to one or more communication networks 424 via an internal bus 422 and/or via a communication interface which can couple this data, via the one or more communication networks 424, to one or more of a central control unit or distributed control units. The one or more of a central control unit or distributed control units can also communicate one or more commands, via the one or more communication networks 424 to the at least one processor of the DESS Management System 406. The at least one processor of the DESS Management System 406 can send control signals via a control interface module 420 to the DESS Array 402 and to individual components thereof.

The DESS Management System 406 includes a Safety Measures controller 418 that can analyze the reported data from the measurement system 404, and any commands received from the one or more of a central control unit or distributed control units, and in response send control signals and/or commands to the DESS Array 402 via the control interface module 420. Safety measures for the DESS Array 402 can be performed by the at least one processor, interoperating with the Safety Measures controller 418, such as actuating electrical isolation of DESMs 324, 326, and/or DESM subcomponents such one or more DEUC Elements 100 and one or more DEUC Stacks 302 in the DEUC Module 324. The at least one processor interoperating with the Safety Measures controller 418, in response to receiving the reported data from the measurement system 404, and any commands received from the one or more of a central control unit or distributed control units, can also actuate electrical connections between DESM subcomponents such one or more DEUC Elements 100 and one or more DEUC Stacks 302 in the DEUC Module 324. Safety measures for the DESS Array 402, as illustrated in the examples provided above, can be performed by the at least one processor of the DESS Management System 406.

DESS Charging and Output Voltage/Amperage Regulation

A dielectric energy storage charge and output voltage regulation system is provided to support the Dielectric Energy Storage Module (DESM) 324, 326. Aspects of the technology applied to create the Dielectric Energy Storage Module are described in various references such as but not limited to U.S. Pat. No. 10,347,443, entitled ADVANCED DIELECTRIC ENERGY STORAGE DEVICE AND METHOD OF FABRICATION. The dielectric energy storage device can include one or more Dense Energy Ultra-Cell (DEUC) modules 100. The dielectric energy storage device stores direct current (DC) voltage. The charging system, according to various embodiments, can accept as input direct current (DC) voltage or alternating current (AC) voltage, and will provide an output stepped-up DC voltage to the solid state-dielectric energy storage device. The output of the dielectric energy storage device, in this example, is DC voltage and current matched by being stepped-down from the stored voltage level of the dielectric energy storage device to a target voltage and current required to be consumed by a desired application. Amperage is regulated on the output voltage to provide the desired application voltage and current. The DC output voltage may be converted to AC voltage depending on application needs, according to various embodiments.

In a battery technology energy storage device, the current amps are depleted as the electric energy is discharged from the battery. Contrary to a battery technology, the DEUC dielectric energy storage system, the voltage is depleted as the dielectric energy is discharged.

There is a broad range of charging systems, voltage step up systems, voltage step down systems, and amperage control systems, which can he used in various embodiments of a Dielectric Energy Storage System (DESS).

In one embodiment, a voltage step-up converter can be applied to charge the DESM. A voltage step-down and current control is required to supply specific voltage and current to power certain applications.

In certain embodiments, a buck regulator configured as a multi-stage step-up converter could be provided for efficient charging of the DESM and a boost converter is applied to step down the charge voltage to the target application voltage. Current limiting electronics may also be applied.

In certain embodiments, a DEUC Cell replaces a smoothing capacitor in the voltage step up, and/or the voltage step down and current limiting systems. According to certain embodiments, for providing high charge voltages, such as up to 1,600 volts dc, and for outputting voltages in accordance with application voltages of up to 600 volts dc, the DEUC Cell offers a compact and high performance energy storage and release device to replace the smoothing capacitor.

An example DESM uses high voltage to obtain a high energy density storage and can be charged with voltages of up to 1,600 volts dc or higher. A voltage of 1,600 volts dc is typically not available so a step-up voltage system can be used for most applications.

In a conventional step-up voltage converter a capacitor is used to smooth the stepped-up voltage and prevent voltage drops below the desired stepped-up voltage.

In one embodiment, the charge voltage is stepped-up using a solid-state dielectric energy storage device. Additionally, the smoothing capacitor can be replaced with a DEUC Cell.

In another embodiment, a charge voltage step-up process can start with a lower voltage and scale the voltage up to the desired charge voltage to ease voltage and current flow into a solid-state dielectric energy storage device.

In another embodiment the smoothing capacitor can be completely removed as the solid-state dielectric energy storage device can accept any voltage below the step-up voltage.

In a high voltage battery technology energy storage device, the voltage can be divided into multiple phases to allow for more efficient voltage regulation.

In one embodiment of a DESM, current is divided with voltage regulation on each current pathway.

To apply the voltage in the DESM, a current control is required with a step-down voltage system to apply the required application voltage.

In one example embodiment, the output current and voltage are divided across parallel paths. The parallel paths provide a current division. Dividing the current across multiple electrical paths allows for a more efficient current control. In this example, the voltage is regulated from each current path to provide a desired voltage on each path. Each electrical pathway can be controlled individually. Two or more electrical pathways may be combined for an application current and voltage. As the DESM is discharged, the voltage is depleted.

In a conventional step-down voltage regulator, a capacitor is used to smooth the voltage and prevent voltage drops below the desired stepped-down voltage from the solid-state dielectric energy storage device.

In one embodiment, the output voltage from a solid-state dielectric energy storage device can be regulated to provide the desired output voltage and current. Smoothing capacitors can be avoided in both voltage regulation and current regulation with a solid-state dielectric energy storage device.

A frequently used method for a power device to convert an input voltage to a specified output voltage includes power conversion at high efficiency by using a switching DC-DC converter.

The switching DC-DC converter controls a first switching element in synchronization with a second switching element, and this allows formation of channels in the switching elements, and thus, resistance of the switching elements in an ON state can be decreased, and high efficiency power conversion can be performed even under a heavy load.

However, although high power conversion efficiency can be obtained under a heavy load, a charging and discharging current occurring when the second switching element switches under a light load becomes non-negligible, so that the overall conversion efficiency lowers.

One embodiment of the present invention provides a step-up DC-DC converter able to change a control scheme of a second switching element when a load current is under a heavy load or when it is under a light load, to provide high efficiency power conversion under both the heavy load and the light load.

In another example of a charge circuit for solid state dielectric energy storage, the first switch is in synchronization with a second switch to reduce the resistance of the switches in the circuit.

In another embodiment, the DESM voltage is monitored and the step-down voltage and amperage control system converts to a step-up voltage and amperage control system once the DESM stored voltage reaches the application voltage. This allows the DESS to continue to provide the application voltage until the DESM stored voltage is discharged to a voltage lower than the application voltage.

These and other objects, features, and advantages of the present invention will become more apparent from the detailed description herein of example embodiments given with reference to the accompanying drawings.

DESS Applications

The DESS provides an energy storage system with rapid charge, 500,000 or more recharge cycles, higher than 4 volts for application voltage support, the elimination of lithium and high energy density to support a broad range of applications. The applications include but are not limited to manned and unmanned electric vehicles, mass transit, manned and unmanned aircraft and drones, manned and unmanned marine and submarine vehicles, space craft and space stations, energy storage for the electric power grid, energy storage for alternative energy generation, power and power backup for mobile and fixed electronic devices, power for personal electronics, power backup for buildings and computer systems, power subcomponents for electronics and charging stations that can provide rapid charge.

Electric Vehicles and Mass Transit

The Dielectric Energy Storage System can be applied to provide power to an electric vehicle and mass transit vehicles or systems to supply the power to the motor that propels the vehicle. The Dielectric Energy Storage System can also support the onboard electronics. The Dielectric Energy Storage System also receives charging from regenerative devices on-board. In one embodiment, during the braking operation, the brake controller directs the electricity produced by the motor into the Dielectric Energy Storage System.

In another embodiment, when the driver steps on the brake pedal of an electric or hybrid vehicle, the brakes can be designed to put the vehicle's electric motor into reverse, causing it to run backwards, thus slowing the car's wheels. While running backwards, the motor also acts as an electric generator, producing electricity that is fed into the Dielectric Energy Storage System.

Aircraft

The Dielectric Energy Storage System applied to manned or unmanned aircraft or drones to supply the power to the motor that propels the aircraft or drone. The Dielectric Energy Storage System can also support the onboard electronics.

Space Exploration

The Dielectric Energy Storage System can be readily applied to spacecraft, space vehicles and space stations.

Marine

The Dielectric Energy Storage System can be readily applied to marine vehicles and submarine vehicles. The Dielectric Energy Storage System provides power to propel manned or unmanned marine and submarine vehicles. The Dielectric Energy Storage System can also support the onboard electronics.

Figure 5:
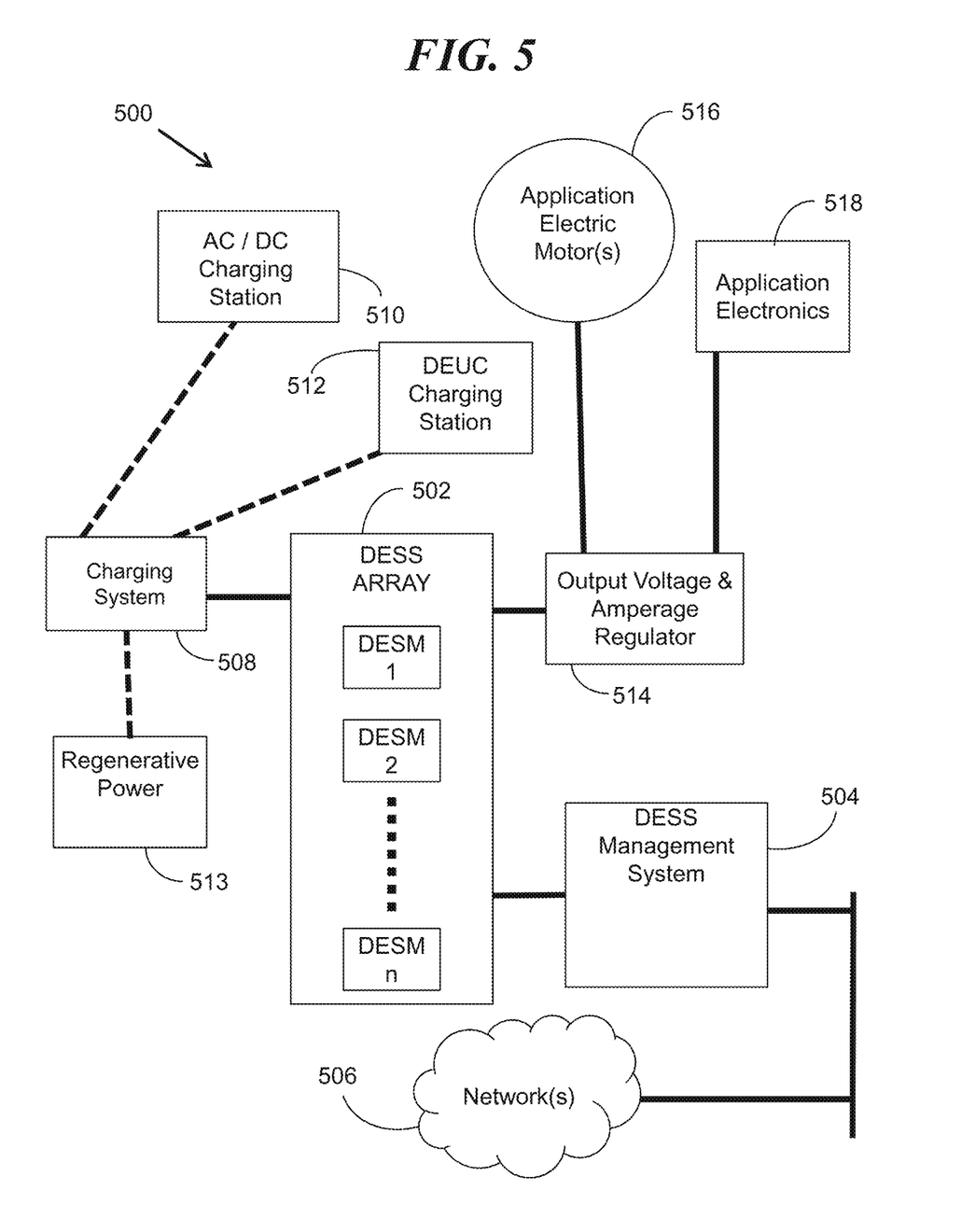
FIG. 5 is a diagram illustrating a second example embodiment of a Dielectric Energy Storage System.

FIG. 5 illustrates one example embodiment of a Dielectric Energy Storage System (DESS) 500, where a Dielectric Energy Storage System (DESS) Array 502 comprises one or more Dielectric Energy Storage Modules (DESM). The DESMs (1 through n) in the DESS Array 502 are charged by the Charging System 508 that receives a direct current electric charge from an AC/DC charging station 510 or a DEUC Charging Station 512. The AC/DC charging station 510 receives, for example, an AC charge from the electric power grid or from an alternative energy generation system 513. An alternative energy generation system 513 can include many different arrangements of electric power generation devices, as alternatives to receiving power from the electric power grid. For example, and not for limitation, solar power generators, wind turbines for power generation, and the like, may be used as the alternative energy generation system 513 in the DESS 500.

If the AC/DC charging station 510 receives AC power it converts the AC power to DC power to feed the DESS Charging System 508.

If the AC/DC charging station 510 receives DC power it feeds the DC power to the DESS Charging System 508. The DESS charging station 510, according to certain embodiments, may receive a charge from a Regenerative Power system 513.

The DESMs (1 to n) in the DESS Array 502 store DC power (charge) for use by one or more applications 516.

The Output Voltage and Amperage Regulator 514 provide an output voltage and amperage designed and regulated to support each particular application. In this example, two example applications are shown, such as electric motor(s) 516 as an application and certain application electronics 518 as an application.

The DESS Management System 504, in this example, monitors, reports, and analyzes DESM components in the DESS Array 502. The DESS Management System 504 receives, for example, sensor data that monitors physical conditions of DESM components in the DESS Array 502, analyzes the sensor data, and provides control signals and commands to the DESS Array 502, such as for implementing corrective measures in case of a fault condition or an out of tolerance measurement is detected.

At least one processor of the DESS Management System 504 can also provide reported data from the DSS Array 502 to one or more communication networks 506 via an internal bus and/or via a communication interface which can couple this data, via the one or more communication networks 506, to one or more of a central control unit or distributed control units. The one or more of a central control unit or distributed control units can also communicate one or more commands, via the one or more communication networks 506 to the at least one processor of the DESS Management System 504. The at least one processor of the DESS Management System 504 can send control signals via a control interface module to the DESS Array 502 and to individual components thereof.

The example embodiment illustrated in FIG. 5 is one of many DESS configurations that can implement dielectric energy storage systems which can provide power for various types of applications, including, but not limited to, an electric vehicle, mass transit vehicles, marine or submarine vehicles, manned or unmanned vehicles, manned or unmanned aircraft, spacecraft, space vehicles and space stations. The example in FIG. 5 also illustrates charging from DEUC charging stations and from regenerative power devices that can optionally be on-board the DESS.

Power Grid

The Dielectric Energy Storage System can be applied to grid energy distribution systems. The DESS charges (or collects energy) from the grid or from a power plant, and then discharges that energy at a later time to provide electricity or other grid services when needed by particular application(s).

Energy Storage for Alternative Energy Generators

The Dielectric Energy Storage System can be applied to store power from an alternative energy system such as but not limited to solar power and wind power. The DESS charges (or collects energy) from the alternative energy generator to be applied to an application or to discharge energy to the electric power distribution grid.

Figure 6:
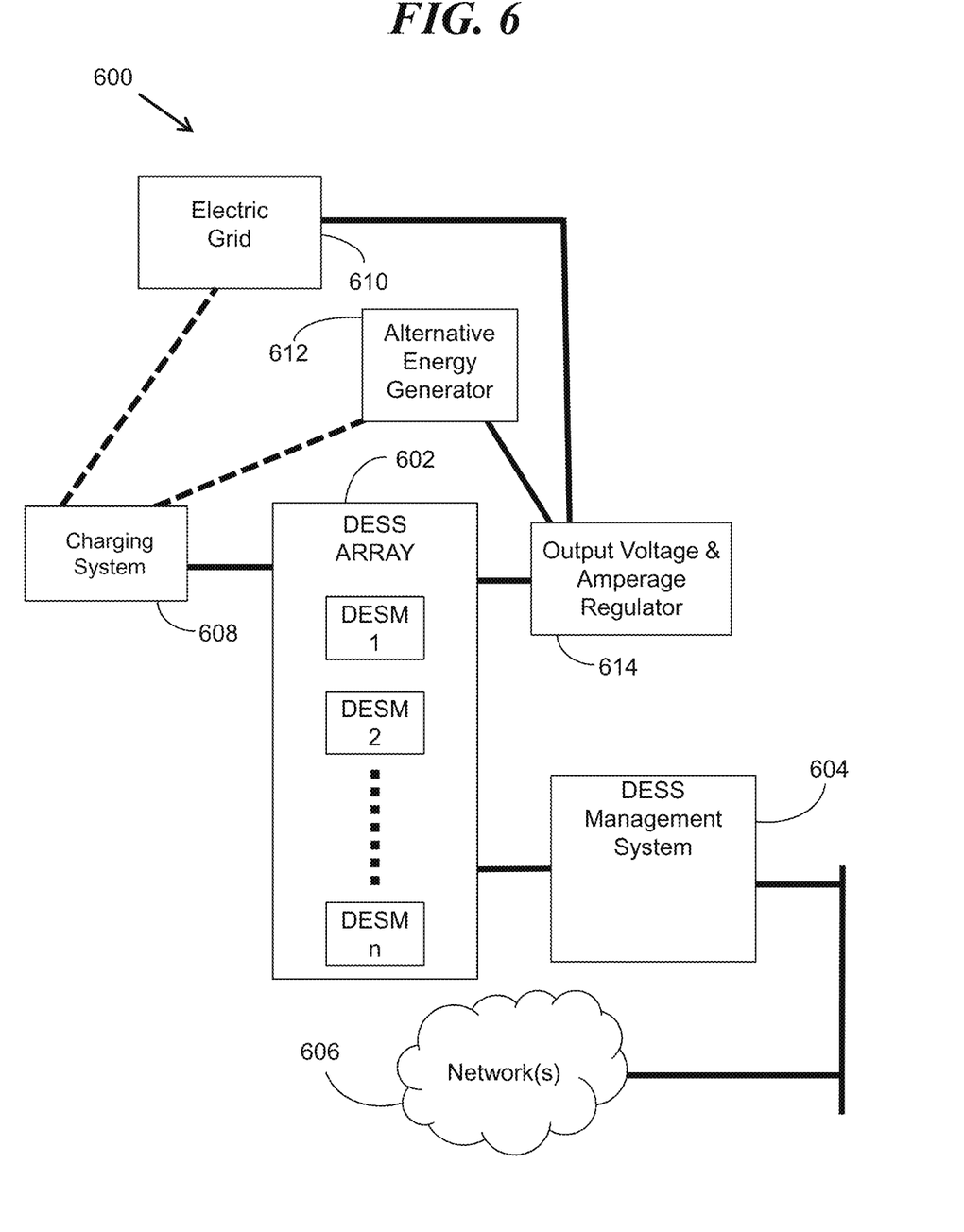
FIG. 6 is a diagram illustrating a third example embodiment of a Dielectric Energy Storage System.

FIG. 6 illustrates an embodiment of a Dielectric Energy Storage System (DESS) 600 where the Dielectric Energy Storage System Array 602 comprises one or more Dielectric Energy Storage Modules (DESM) (1 to n).

The DESMs (1 to n) in the DESS Array 602 are charged by the Charging System 608 that can receive a direct current electric charge from an AC/DC charging station (not shown in FIG. 6, but an example is shown in FIG. 5) or a DEUC Charging Station (not shown in FIG. 6, but an example is shown in FIG. 5) that are connected to the Electric Grid 610.

The DESMs (1 to n) in the DESS Array 602 store DC power (electric charge) for use by one or more applications. The stored DC power (voltage) can be converted back to AC voltage and then coupled into the Electric Grid 610.

The Output Voltage and Amperage Regulator 614 provides output voltage and amperage designed and regulated to support particular application(s) or provides a DC/AC conversion system to supply voltage (power) into the Electric Grid 610.

The DESS Management System 604 monitors, reports, and analyzes, DESM components of the DESS Array 602 and allows control of the DESS Array 602 for implementing corrective and safety measures such as in case of a fault condition or an out of tolerance measurement.

At least one processor of the DESS Management System 604 can also provide reported data from the DESS Array 602 to one or more communication networks 606 via an internal bus and/or via a communication interface which can couple this data, via the one or more communication networks 606, to one or more of a central control unit or distributed control units. The one or more of a central control unit or distributed control units can also communicate one or more commands, via the one or more communication networks 606 to the at least one processor of the DESS Management System 604. The at least one processor of the DESS Management System 504 can send control signals via a control interface module to the DESS Array 602 and to individual components thereof.

The example embodiment illustrated in FIG. 6 is one of many DESS configurations that can support energy storage for use by particular applications and for coupling electric power into the electric power distribution grid 610.

Power Backup

The Dielectric Energy Storage System can be applied to provide reliable power and backup power to a building.

Computer Systems Power Backup

The Dielectric Energy Storage System can be applied to provide reliable and backup power to computer systems.

Figure 7:
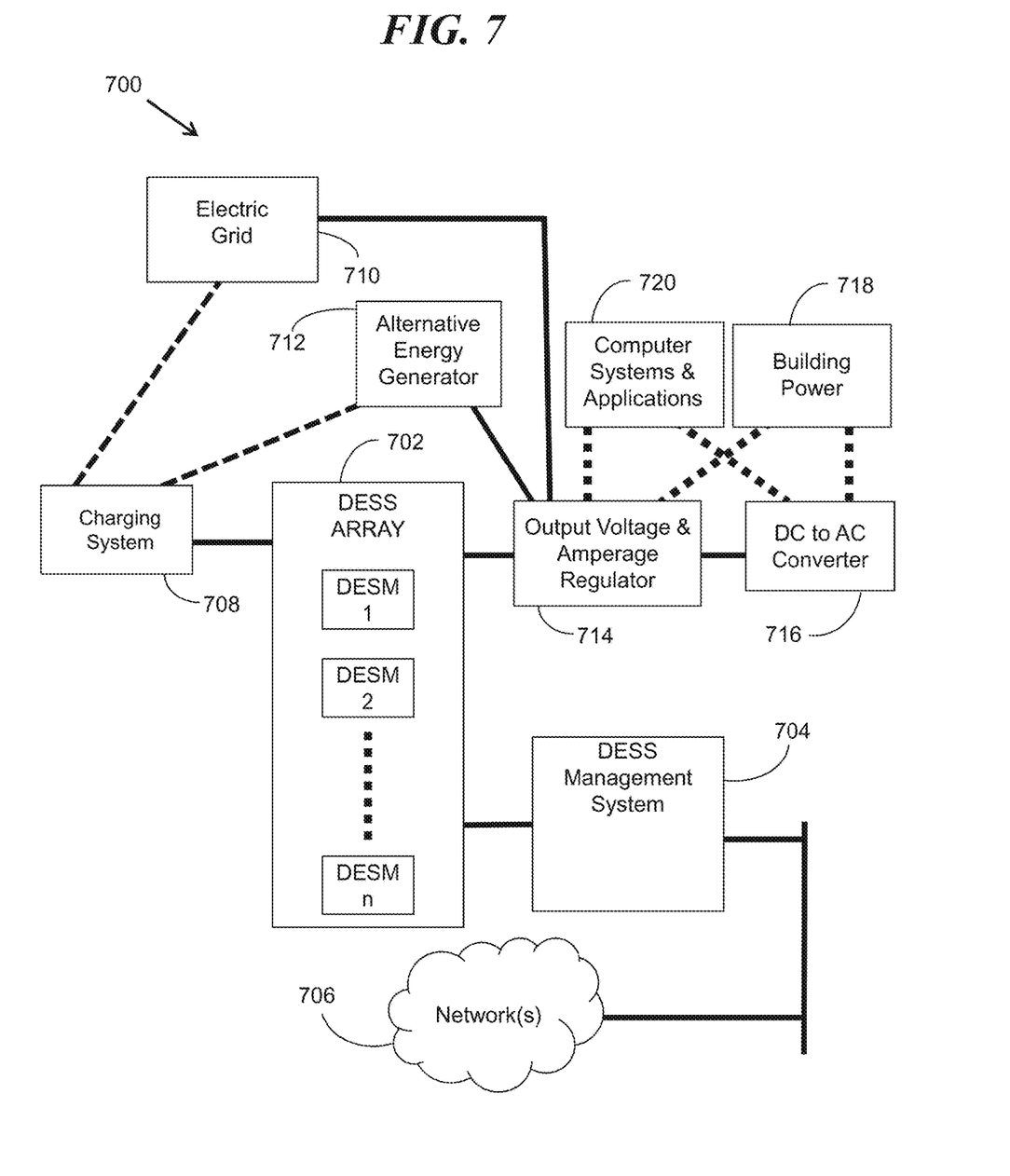
FIG. 7 is a diagram illustrating a fourth example embodiment of a Dielectric Energy Storage System.

FIG. 7 illustrates one embodiment of a Dielectric Energy Storage System (DESS) 700 where a Dielectric Energy Storage System Array 702 comprises one or more Dielectric Energy Storage Modules (DESM) (1 to n). The DESMs (1 to n) in the DESS Array 702 are charged by the Charging System 708 which can receive a direct current (DC) electric charge from an AC/DC charging station (not shown in FIG. 7, but an example is shown in FIG. 5) or a DEUC Charging Station (not shown in FIG. 7, but an example is shown in FIG. 5). The AC/DC charging station receives an AC charge (power) from the electric grid 710 or from alternative energy generation system 712. If the AC/DC charging station receives AC power it converts the AC power to DC to feed this power to the DESS Charging System 708. If the AC/DC charging station receives DC power it feeds the DC power to the DESS Charging System 708. The DESS charging station, according to certain embodiments, may receive a charge from a Regenerative Power system (not shown in FIG. 7, but an example is shown in FIG. 5).

The DESMs (1 to n) in the DESS Array 702 store DC power (charge) for use by one or more applications.

The Output Voltage and Amperage Regulator 714 provide an output voltage and amperage designed and regulated to support each particular application. In this example, two applications are shown, e.g., a building power system 718 or computer systems and application s 720.

The DESS Management System 704 monitors, reports, and analyzes sensor data and other data from DESM components in the DESS Array 702. The DESS Management System 704 also provides control signals and commands to the DESS Array 702, and subcomponents thereof, such as to implement corrective and safety measures in case of a fault condition or an out of tolerance measurement being detected by the DESS Management System 704.

At least one processor of the DESS Management System 704 can also provide reported data from the DSS Array 702 to one or more communication networks 706 via an internal bus and/or via a communication interface which can couple this data, via the one or more communication networks 706, to one or more of a central control unit or distributed control units. The one or more of a central control unit or distributed control units can also communicate one or more commands, via the one or more communication networks 706 to the at least one processor of the DESS Management System 704. The at least one processor of the DESS Management System 704 can send control signals via a control interface module to the DESS Array 702 and to individual components thereof.

The embodiment illustrated in FIG. 7 is one of many DESS configurations that provide energy storage for applications, such as the examples in FIG. 7 which include an electrical power distribution system of a building, an electrical power supply for a computer system, an electrical power backup system, a reliable (e.g., fault-tolerant) electrical power distribution system, and a peak power saving arrangement (e.g., charge energy storage of a DESS, and provide electrical power to an application, from an electrical power distribution grid system during time of lower cost of energy distribution to the DESS, or alternatively stop consuming all electrical power from the electrical power distribution grid system during time of higher cost of energy distribution to the DESS and the application while supplying electrical power to the application from the stored energy in the DESS).

Mobile Electronic Devices

The Dielectric Energy Storage System applied to provide power to a mobile electronics device. The Dielectric Energy Storage System can rapidly charge and power a mobile electronics device and be applied as an electronic subcomponent to power individual device components that consume power such as a visual display.

Fixed Electronic Devices

The Dielectric Energy Storage System applied to provide power to a fixed electronics device. The Dielectric Energy Storage System can rapidly charge and power a fixed electronics device and be applied as an electronic subcomponent to power individual device components that consume power such as a visual display.

Personal Electronics

The Dielectric Energy Storage System can be applied to personal electronic devices such as wearable electronics, personal computers, cell or mobile phones, communications devices, police personal equipment, body cameras or military personnel equipment.

Electronic Circuit

The Dielectric Energy Storage System can be applied as components of an electronic circuit. The electronic circuit can be applied as a subcomponent of a product such as a cell or mobile phone, a computer, or communications devices or electronics that support other applications.

Charging Stations

The Dielectric Energy Storage System applied as energy storage for charging stations used to charge mobile DESS systems and applications such as but not limited to manned and unmanned electric vehicles, manned and unmanned mass transit vehicles, manned and unmanned aircraft, manned and unmanned marine and submarine vehicles, manned and unmanned space vehicles, personal devices and communications devices.

DESS Management

The DESS Management System (DESS-MS) monitors a variety of parameters and manages the DESS operational characteristics to provide optimized performance and increase safety measures.

Battery technologies including Li-Ion cells are very sensitive to operating parameters. Operating cells out of the specified voltage, current and temperature ranges can cause critical damage to the battery cells. In some cases, this can lead to thermal runaway where the battery cell has an irreversible chemical reaction resulting in fire and possible explosion. Battery management systems are critical components for safety and continued operational performance. Battery Management Systems (BMS) are required to monitor and control the battery packs such that all cells are never crossing parameter thresholds at any point in time.

When compared to a battery, the DESS is a solid-state dielectric energy storage device and provides significantly higher power and energy density. There is no electrolyte and no lithium in a Dielectric Energy Storage Module (DESM). The DESM is far less sensitive to operating parameters such as voltage, current and temperature ranges. The DESM is based on the DEUC Element which resembles a multilayer ceramic capacitor with metal electrodes and ceramic energy storage layers. The DEUC Element can withstand high levels of heat, discharge high levels of voltage and amperage and accept high levels of voltage and amperage during recharge without degradation and danger of fire or possible explosion.

The DESM is a solid-state dielectric energy storage module. Dielectric Energy Storage Modules (DESM) can be discharged to zero with no impact. Additionally, the DESM has a charge cycle life that is 100 to 1,000 times greater the recharge cycles of batteries.

The DESM solid-state energy storage array can charge and discharge at high voltages. With charge voltages of 2,000 volts or more and discharge voltages equal to the required application voltage. This reduces or eliminates the need to connect the energy storage devices in series to raise the output voltage to meet application requirements.

This significantly reduces the number of cells required to meet applications needs. This in return, reduces the complexity of the energy management system and enables improved monitoring capabilities through greater detail applied to the individual DESMs and DEUC Elements in the DESS Array.

The DESS Management System (DESS-MS) tasks can include monitoring system and DSS Array performance, power management, and implementing safety measures for the DESS. DESS-MS are sensing the DESS Elements and/or DESS Module parameters and estimating physical conditions of the DESM and DESS Array along with the subcomponents thereof, such as based on their state of charge (SoC). The DESM can provide high voltage and high amperage avoiding the need to place the DESM devices in series to provide the desired application voltage and amperage.

For example: one DESM may be used to provide 120 volts. In most cases, the DESM system can be configured purely as a parallel layer without series connections. If the DESM are applied in series to increase voltage, the DESM array can be configured to have only a few (2 to 3) DESMs in the series string and should not require active balancing.

Beyond DESMS, which comprise sensing, control and computational capabilities, the design of the electrical interconnection of DESS Management System is a useful advantage of various embodiment of the invention. Traditionally, battery management systems have been designed in a static fashion where the topology of the series and parallel-connected cells has been fixed. Additionally, the hardware/software architecture has been organized in a centralized fashion.

The DESS-MS architecture takes advantage of new capabilities and system architectures. It is proposed that a variety DESS-MS architectures including:

Central control unit with a static DESS-MS configuration

Distributed control units with a static DESS-MS configuration

Central control unit with a dynamic DESS-MS configuration

Distributed control units with dynamic DESS-MS configuration

The data network connecting the DESS-MS nodes, control units and the DESS-MS sensors can be ubiquitous and can use any communications method best suited for the application such as data over power communications.

The communications protocols and methods are ubiquitous and can use any communications method best suited for the application such as controller area network (Can) or Local Interconnect (Lin) networks.

According to various embodiments, safety disconnects are applied at each level of the DESM Array. At the DEUC Element level, the electrodes are designed to limit voltage, amperage and heat. The electrodes will move to an open state disconnecting the DEUC Element from the parallel element array. At the DEUC Stack level, the elements are designed to limit voltage, amperage and heat.

An element in the stack will move to an open state disconnecting the Element from the Stack. At the DEUC Cell level, the stacks are designed to limit voltage, amperage and heat. A stack within the DEUC cell will move to an open state disconnecting the DEUC Stack from the DEUC Cell. At the DESS Array level, DEUC cells can be designed to limit voltage, amperage and heat. A DEUC cell within the DEUC Array will move to an open state disconnecting the DEUC Cell from the DEUC Array.

In some cases the disconnected device may be re-inserted (reconnected) into the DEUC Array.

DESS-MS monitors may be positioned on each DEUC Stack or DEUC Cell or DESS Module to monitor the state of the DESS components reporting various measurements including:

Voltage output of individual DESS Modules and subcomponents

Temperature of each DESS Module and subcomponents

Coolant intake and output temperatures where cooling devices are applied

Current in or out of the DESS Module or subcomponents.

Health monitoring analysis is applied data from the monitoring positions:

Charge Cycle Monitoring

State of Charge (SoC) and depth of discharge (DOD)

State of health (SoH), a defined measurement of the overall condition of the DESS Array, DESS Module and subcomponents.

Current in or out of the DESS Module and subcomponents.

Fault Tolerant:

The DESS-MS system would be able to disconnect a DESM or subcomponents from the system if necessary, to enable improved operation and safety.

Additionally, the DESS-MS can calculate statistics, such as:

Maximum charge current as a charge current limit (CCL)

Maximum discharge current as a discharge current limit (DCL)

Energy [kWh] delivered since last charge or charge cycle

Internal impedance of a DESM or subcomponent (to determine open circuit voltage)

Charge [Ah] delivered or stored (sometimes this feature is called Coulomb counter)

Total energy delivered since first use

Total operating time since first use

Total number of cycles

DESS Safety

The DESM may be filled with a dielectric fluid to act as an insulating and isolating fluid between the internal components of the DESM. In addition, a dielectric fluid with Electrorheological (ER) characteristics can be used as a damper fluid. In one embodiment, these fluids may flow through the DESM to cool the DESM components and pass through a cooling station and return to the DESM. In another embodiment the fluids may reside in the DESM and be cooled by a heat sink.

An electrorheological (ER) fluid is a suspension composed of dielectric particles and isolating oil that has a broad range of potential applications in dampers, microfluids, etc.

Electrorheological (ER) fluids are suspensions of extremely fine non-conducting but electrically active particles (up to 50 microns in diameter) in an electrically insulating fluid. The viscosity of an ER fluid changes reversibly by an order of up to 100,000 in response to an electric field. For example, a typical ER fluid can go from the consistency of a liquid to that of a gel and back, within milliseconds. This would dampen the actions of an electrical explosion within the DESM.

To ensure safety in case of a short in the DESS system, multiple layers of fused and or switching devices are deployed at strategic points within the DESM and subcomponents and between DESMs in the DESS Array.

The fist fused point is at the DEUC Element where the electrode layers within the DEUC Elements are designed to create an open and disconnect from the collection plate upon a short across the left and right electrode.

The next fused point is at the DEUC Stack where the DEUC Element is designed to create an open and disconnect the DEUC Element from the DEUC Stack upon a short between the positive and negative DEUC Stack collectors.

The next safety point is at the DEUC Cell where the DEUC Cell is designed to create an open and disconnect the DEUC Cell from the DESM array upon a short within the DEUC Cell.

The next safety point is at the DESS Array where the DESM is designed to create an open and disconnect the DESM from the DESS-Array upon a short within the DESM.

The applications, management and safety measures described above do not represent the limits of the DESS and many additional applications can be envisioned.

The features and advantages described in the specification are not all inclusive, and particularly, many additional features and advantages will be apparent to one of ordinary skill in the art in view of the description, specification and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

An embodiment of the present subject matter can be embedded in a computer program product, which comprises all the features enabling the implementation of the methods described herein, and which—when loaded in a computer system—is able to carry out these methods. Computer program in the present context means any expression, in any language, code or notation, of a set of instructions intended to cause a system having an information processing capability to perform a particular function either directly or after either or both of the following a conversion to another language, code or, notation; and b reproduction in a different material form.

Each computer system may include, inter alia, one or more computers and at least a computer readable medium allowing a computer to read data, instructions, messages or message packets, and other computer readable information from the computer readable medium. The computer readable medium may include computer readable storage medium embodying non-volatile memory, such as read-only memory ROM, flash memory, disk drive memory, CD-ROM, and other permanent storage. Additionally, a computer medium may include volatile storage such as RAM, buffers, cache memory, and network circuits. Furthermore, in certain embodiments of the computer readable medium, other than a computer readable storage medium as discussed above, the computer readable medium may comprise computer readable information in a transitory state medium such as a network link and/or a network interface, including a wired network or a wireless network, that allow a computer to read such computer readable information.

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

Supporting Language for Claims

A Dielectric Energy Storage System (DESS) that is comprised of a Dielectric Energy Storage Module (DESM) combined with a charging system and an output voltage and amperage system that support energy storage and power to an application and where the DESS is comprised of:
  a. one or more DEUC Elements, where
  b. the one or more DEUC Elements are combined as a Dielectric Energy Storage Module (DESM), and
  c. where a charging system is coupled to and part of the DESM to support charging of the DESS, and
  d. where an output voltage and amperage regulator system is coupled to and part of the DESM to provide controlled output voltage and amperage from the DESS.

The Dielectric Energy Storage System where the electrical power charging system comprises a step-up voltage system to provide the required charge voltage of the dielectric energy storage system.

The Dielectric Energy Storage System where the voltage regulator system comprises a voltage step down system with controlled amperage to meet the voltage and amperage requirements consumed by a particular application (e.g., such as any of the examples shown in FIGS. 5, 6, and 7).

The Dielectric Energy Storage System where the dielectric energy storage systems is applied to provide power an electric vehicle, mass transit vehicles, marine or submarine vehicles, manned or unmanned vehicles, manned or unmanned aircraft, spacecraft, space vehicles and space stations.

The Dielectric Energy Storage System where the Dielectric Energy Storage Systems receives charging from regenerative power devices on-board.

The Dielectric Energy Storage System where the dielectric energy storage system is configured to receive/provide electrical power from/to a grid electrical energy distribution system.

The Dielectric Energy Storage System where the dielectric energy storage system is configured to provide electrical power to mobile and fixed electronic devices.

The Dielectric Energy Storage System where the dielectric energy storage system is configured to provide reliable electrical power supply and backup electrical power supply to an electrical energy distribution system of a building.

The Dielectric Energy Storage System where the dielectric energy storage system is configured to provide reliable electrical power supply and backup electrical power supply to a computer system.

The Dielectric Energy Storage System where the dielectric energy storage system is configured to store power from an alternative electrical energy generation system such as, but not limited to, solar based electrical power generators and wind based electrical power generators.

The Dielectric Energy Storage System where the dielectric energy storage system is configured to supply electrical power to a personal electronic device.

The Dielectric Energy Storage System where the dielectric energy storage system comprises an electrical power charging station for the DESS.

The Dielectric Energy Storage System where the output voltage and amperage regulator system monitors the voltage level in the DESM and converts from a step-down voltage regulator to a step up voltage regulator to allow the DESS to continue to provide application voltage when the DESM charge is lower than the application voltage.

A Dielectric Energy Storage System Management System (DESS-MS) for a Dielectric Energy Storage System (DESS) comprising of:
  One or more sensor modules connected to one or more DEUC Elements, where one or more DEUC Elements are subcomponents of a Dielectric Energy Storage Module (DESM), and
  Where said sensor module is configured to monitor one or more parameters of a DESM, and
  Where the DESM is connected to a network that allows data to be transmitted to and/or from the sensor module and the central control unit or the distributed control units for analysis, and
  Where each of said sensor modules has a programmable address to allow the monitoring system to recognize the position of the sensor and the one or more dielectric energy storage device(s) that said sensor module represents, and
  Where the sensor records the address of number of times the one or more subcomponents of a DESM have values that exceed one or more threshold values, and Wherein the one or more sensors may report a fault condition to the monitoring system based on measured values and thresholds, and The DESS-MS interface to the control unit may be through a wireless application, communicating via wireless communication network(s), and/or a voice recognition system that recognizes uttered voice commands and provides information as a voice response (e.g., in response to a received uttered voice command).

The DESS-MS wherein a central control unit, or distributed control units, may send a command to a DESM subcomponent (e.g., a DEUC controller module 326 associated with a sensor module that reported sensor data) that in response removes or replaces a DESM subcomponent (e.g., a DEUC Stack 302).

The DESS-MS wherein the sensor module controller is connected to a network configured to process data communicated from any one of said plurality of sensor modules and provide alarms associated to preset values.

The DESS-MS comprising the following steps;
sensing one or more parameters with the one or more sensor modules;
recording the number of times one or more sensed cell values exceed one or more threshold values,
communicating data related from each sensor module of the one or more sensor modules to one or more DEUC controller module(s),
recognizing a position of the each sensor module and the DESS devices that it represents through the sensor module addressing,
storing and analyzing the sensor data to report performance and fault conditions,
taking predetermine steps when a fault condition is determined, and
reporting the DESS Array performance commands to be sent to the sensor module to affect removal or replacement of the DESS devices reporting the fault condition.

The Dielectric Energy Storage System where one or more DESM are configured as a sealed unit with dielectric fluid applied to isolate electric charge.

The Dielectric Energy Storage System where one or more DESM are configured as a sealed unit with dielectric fluid applied to cool the DESM components and allow the dielectric fluid to move out of the DESM to be cooled and back into the DESM.

The Dielectric Energy Storage System where one or more DESM's are configured as a sealed unit containing dielectric fluid that has electrorheological (ER) fluid characteristics that act as an insulating and isolating fluid between the internal components of the one or more DESM's. In addition, a dielectric fluid with Electrorheological (ER) characteristics can be used as a damper fluid in the one or more DESM's. This arrangement of a DESM with dielectric fluid that has electrorheological (ER) fluid characteristics enhances safety of using the DESM in various applications. According to various embodiments, characteristics of the dielectric fluid with Electrorheological (ER) properties, which can be contained in one or more DESM's, can be controlled by any one or more of: an information processing system, a processor, or a Dielectric Energy Storage System Management System (DESS-MS). For example, and not for limitation, a viscosity of the dielectric fluid can be quickly (e.g., within a fraction of a second), accurately, and reversibly, changed under control from a controlling device or system.

A dielectric energy storage device based on a multilayer ceramic capacitor device as described in the examples discussed herein can be described as a Dense Energy Ultra-Cell Element (DEUC Element). The DEUC Element is a building block used to create, according to various embodiments, one or more of the following:
a DEUC Cell
where one or more DEUC Elements are connected in series and/or in parallel circuit(s) to form a DEUC Cell, and
a DEUC Module
where one or more DEUC Cells are combined and interconnected in series and/or in parallel circuit(s) to form a DEUC Module, and
a DEUC Module Array (which may also be referred to as a DESS Array)
where one or more DEUC Modules are combined and interconnected in series and/or parallel circuit(s) to form a DEUC Module Array.

The DEUC Element, DEUC Cell, DEUC Module and DEUC Module Array, according to various embodiments, can be applied to store and provide electrical power to at least one of the following: micro devices and integrated circuits, electric vehicles, aircraft, boats, ships, unmanned aerial, terrestrial or water vehicles, electronic cigarettes, computing devices, mobile computing devices, laptops, tablets, mobile phones, wireless communication devices, and mobile sensor systems, energy storage for an electric power grid, power backup, energy storage for solar, wind, and other alternative energy generation systems, and uninterruptible power supplies. The previously list of embodiments is not exhaustive, and one or more of the listed embodiments might overlap with each other. For example, and not for limitation, a mobile computing device is also a computing device; a mobile phone is also a mobile computing device, etc.

Non-Limiting Examples

The present invention may be implemented as a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a Memory Stick®, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk®, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, implement the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the functions/acts specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present specification may describe components and functions implemented in the embodiments with reference to particular standards and protocols, the invention is not limited to such standards and protocols. Each of the standards represents examples of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this invention. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single example embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although only one processor is illustrated for an information processing system, information processing systems with multiple central processing units (CPUs) or processors can be used equally effectively. Various embodiments of the present invention can further incorporate interfaces that each includes separate, fully programmed microprocessors that are used to off-load processing from the processor. Additionally, various embodiments can include an input user interface, and an output user interface, or both. Examples of input user interfaces can include, for example and not for limitation, a mouse, a keyboard, a keypad, a touchpad, or a microphone for receiving uttered voice commands and input data. Examples of output user interfaces can include, for example and not for limitation, a display, lights, lamps, tactile output devices, or a speaker for outputting audible signals and/or voice responses to received uttered voice commands and input data.

An operating system included in main memory for a processing system may be a suitable multitasking and/or multiprocessing operating system, such as, but not limited to, any of the Linux®, UNIX®, Windows®, and Windows® Server based operating systems. Various embodiments of the present invention are able to use any other suitable operating system. Various embodiments of the present invention utilize architectures, such as an object oriented framework mechanism, that allow instructions of the components of the operating system to be executed on any processor located within an information processing system. Various embodiments of the present invention are able to be adapted to work with any data communications connections including, but not limited to, present day analog and/or digital techniques, via wired communication, via wireless communication, via short range wireless communication, via long range wireless communication, via optical communication, via fiber optics communication, via satellite communication, or via a future networking mechanism.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The terms "communicatively coupled" or "communicatively coupling" include, but are not limited to, communicating electronic control signals by which one element may direct or control another. The term "configured to" describes hardware, software or a combination of hardware and software that is set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. Any suitably configured processing system is similarly able to be used by embodiments herein, for example and not for limitation, a personal computer, a laptop personal computer (laptop PC), a tablet computer, a smart phone, a mobile phone, a wireless communication device, a personal digital assistant, a workstation, and the like. A processing system may include one or more processing systems or processors. A processing system can be realized in a centralized fashion in one processing system or in a distributed fashion where different elements are spread across several interconnected processing systems.

The corresponding structures, materials, acts, and equivalents of all means or step plus function elements in the claims below are intended to include any structure, material, or act for performing the function in combination with other claimed elements as specifically claimed.

The description of the present application has been presented for purposes of illustration and description, but is not intended to be exhaustive or limited to the invention in the form disclosed. Many modifications and variations will be apparent to those of ordinary skill in the art without departing from the scope of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A Dielectric Energy Storage System (DESS) comprising:
   a Dielectric Energy Storage Module (DESM) including one or more Dense Energy Ultra-Cell (DEUC) Elements;
   a charging system coupled to an input of the DESM for charging the DESM from an external electrical energy source; and
   an output voltage and amperage regulator system coupled to an output of the DESM to supply controlled voltage and amperage from the DESM to an application which consumes stored electrical charge energy from the DESM as the supplied controlled voltage and amperage is provided to the application under control by the output voltage and amperage regulator system.

2. The Dielectric Energy Storage System of claim 1, where the charging system is a step-up voltage system to provide required charge voltage of the Dielectric Energy Storage System (DESS).

3. The Dielectric Energy Storage System of claim 1, where the voltage and amperage regulator system comprises a voltage step down system with controlled voltage and amperage to meet voltage and amperage supply requirements consumed by the application.

4. The Dielectric Energy Storage System of claim 1, where the dielectric energy storage system is configured to provide electrical power to one or more of: an electric vehicle, mass transit vehicles, marine or submarine vehicles, manned or unmanned vehicles, manned or unmanned aircraft, spacecraft, space vehicles and space stations, or a combination thereof.

5. The Dielectric Energy Storage System of claim 1, where the Dielectric Energy Storage System receives charging energy from one or more regenerative electrical power devices on-board the DESS.

6. The Dielectric Energy Storage System of claim 1, where the dielectric energy storage system is configured to at least one of:
   receive charging energy input from a grid energy distribution system; or
   couple charging energy output to the grid energy distribution system.

7. The Dielectric Energy Storage System of claim 1, where the dielectric energy storage system is configured to provide electrical power to at least one of a mobile electronic device or a fixed electronic device.

8. The Dielectric Energy Storage System of claim 1, where the dielectric energy storage system is configured to provide reliable electrical power supply and backup electrical power supply to an electrical energy distribution system of a building.

9. The Dielectric Energy Storage System of claim 1, where the dielectric energy storage system is configured to provide reliable electrical power supply and backup electrical power supply to a computer system.

10. The Dielectric Energy Storage System of claim 1, where the dielectric energy storage system is configured to store power from an alternative energy generation system comprising at least one of: a solar based electrical power generator or a wind based electrical power generator.

11. The Dielectric Energy Storage System of claim 1, where the dielectric energy storage system is configured to supply electrical power to a personal electronic device.

12. The Dielectric Energy Storage System of claim 1, where the dielectric energy storage system comprises an electrical power charging station for the DESS.

13. The Dielectric Energy Storage System of claim 1, where the output voltage and amperage regulator system monitors a voltage level in the DESM and converts from a step-down voltage regulator to a step up voltage regulator to allow the DESS to continue to supply the controlled voltage and amperage consumed by the application, while the monitored voltage level in the DESM is lower than a voltage level needed by the step-down voltage regulator to supply the controlled voltage and amperage consumed by the application.

14. The Dielectric Energy Storage System of claim 1, where one or more DESM are configured as a sealed unit containing dielectric fluid applied to isolate electric charge.

15. The Dielectric Energy Storage System of claim 1, where each of one or more DESM is configured as a sealed unit containing dielectric fluid applied to cool components in the each DESM and to allow the dielectric fluid to move out of the each DESM to be cooled and back into the each DESM.

16. The Dielectric Energy Storage System of claim 1, where each of one or more DESM is configured as a sealed unit with dielectric fluid that has electrorheological (ER) fluid characteristics that are controlled by at least one of: a Dielectric Energy Storage System Management System (DESS-MS), a processor, or a processing system.

* * * * *